May 5, 1953       E. STRUNK       2,637,633
APPARATUS FOR STRIPPING FLUID TYPE CATALYSTS
Filed Oct. 18, 1948                     2 SHEETS—SHEET 2

*INVENTOR.*
EDWARD STRUNK
BY *Hudson and Young*
*ATTORNEYS*

Patented May 5, 1953

2,637,633

UNITED STATES PATENT OFFICE 2,637,633

APPARATUS FOR STRIPPING FLUID TYPE CATALYSTS

Edward Strunk, Bartlesville, Okla., assignor to Phillips Petroleum Company, a corporation of Delaware Application October 18, 1948, Serial No. 55,127

5 Claims. (Cl. 23—288)

This invention relates to contacting solid particles with gaseous fluids. In one embodiment it relates to stripping or purging entrained volatile materials from solid particles. In a more specific embodiment this invention relates to apparatus adapted for stripping hydrocarbons from a used fluidized oil cracking catalyst.

In certain catalytic operations, such as the catalytic cracking of hydrocarbon oils to produce lower boiling hydrocarbons, hydrocarbon gases and/or vapors are entrained with the catalyst or contact particles removed from the contacting or conversion zone and it is desirable to remove such vapors and/or gases from the particles before using them in another contacting or conversion step or before regenerating them prior to re-use. Although various types of stripping gases have been suggested steam is very desirable for this purpose, however, other types of stripping gases, such as spent combustion gases, low molecular weight hydrocarbon gases, and the like, may be employed.

In the improved design of catalytic cracking units, the catalyst or contact particles are maintained in a dense, dry, fluidized condition in the reaction zone wherein hydrocarbons in vapor or gas form are contacted with the solid contact particles. The hydrocarbon vapors or gases pass upwardly through the dense fluidized mixture in the reaction zone and the vaporous reaction products containing only a small amount of entrained solid particles are taken overhead from the reaction zones. The spent or contaminated contact or catalyst particles are withdrawn as a dense fluidized mixture from a lower portion of the reaction zone.

The spent or contaminated particles which are withdrawn from the reaction zone contain entrained hydrocarbon vapors or gases, and before regenerating the particles it is desirable to remove the entrained hydrocarbons in a stripping or purging step to recover the hydrocarbons and to reduce the amount of burning necessary in the regeneration zone. It is known that improved stripping may be obtained if the stripping gas flows countercurrently to the catalyst particles in a cellular section having a high ratio of length to diameter.

The present invention relates to an improved design for a stripping or purging section in such a catalytic reaction zone. A mixture of catalyst or contact particles and hydrocarbon vapors or other reactants is introduced into the bottom portion of a reaction zone through a hollow conical member or chamber provided with a horizontally arranged perforated distribution plate. Surrounding the conical member is an annular space or chamber formed by a sleeve or skirt depending from the upper portion of the conical member or distribution plate and spaced from the inner wall of the reaction vessel. This skirt extends a distance below the distribution plate and forms with the wall of the vessel an annular stripping section in the lower portion of the reaction vessel. The space below the conical inlet member is reduced in volume by a lower inverted conical member extending from the skirt and spaced from the conical bottom portion of the reaction vessel. In accordance with this invention, partition plates are arranged radially along the bottom conical head of the reaction vessel and communicate with the inverted conical member extending from said skirt, thereby forming a plurality of relatively long radial cellular stripping sections inclined downwardly at an angle of about 15 to 75 degrees from the vertical and preferably between about 25 and 50 degrees from the vertical. The width of each radial stripping section decreases toward the center of the reactor and the height of each cell increases toward the center of the reactor to maintain the required flow area for proper flow rates of catalyst and stripping medium. A stripping medium, such as steam, inert gas, or the like, is introduced near the end of each stripping section from which the catalyst emerges in leaving the vessel.

Certain existing cellular stripping designs of the vertical type have a serious disadvantage in that they require a certain portion of the reactor height in which to operate. If this type of stripper is installed in an existing reactor the effective fluidized bed is seriously reduced, or if this type of stripper is designed for a new reactor an increase in the length of the reactor will be required at an additional expenditure for steel. In addition, existing cellular stripping designs have tendencies toward channeling of catalyst and stripping medium. The design of the present invention reduces the height requirement of a reaction vessel and by virtue of having the catalyst outlets of the cellular stripping sections converging at a common point greatly reduces the tendency of the catalyst to channel.

An object of this invention is to provide an improved design for stripping volatile material adsorbed on or associated with solid contact particles. Another object is to provide an improved apparatus for stripping hydrocarbon material from a fluidized oil cracking catalyst. Other objects and advantages of this invention will be apparent from the accompanying disclosure and discussion.

With the general nature and objects in view, the invention will be better understood by reference to the accompanying diagrammatic drawing which illustrates one form of equipment which may be utilized in carrying out the invention. This invention will be specifically described in connection with the catalytic cracking of hydrocarbons but it is to be understood that this is by way of illustration only and that this invention may be used with other processes, such as hydrogenation, dehydrogenation, reforming or the like, where it is desired to remove strippable material from subdivided solids.

Figure 1:
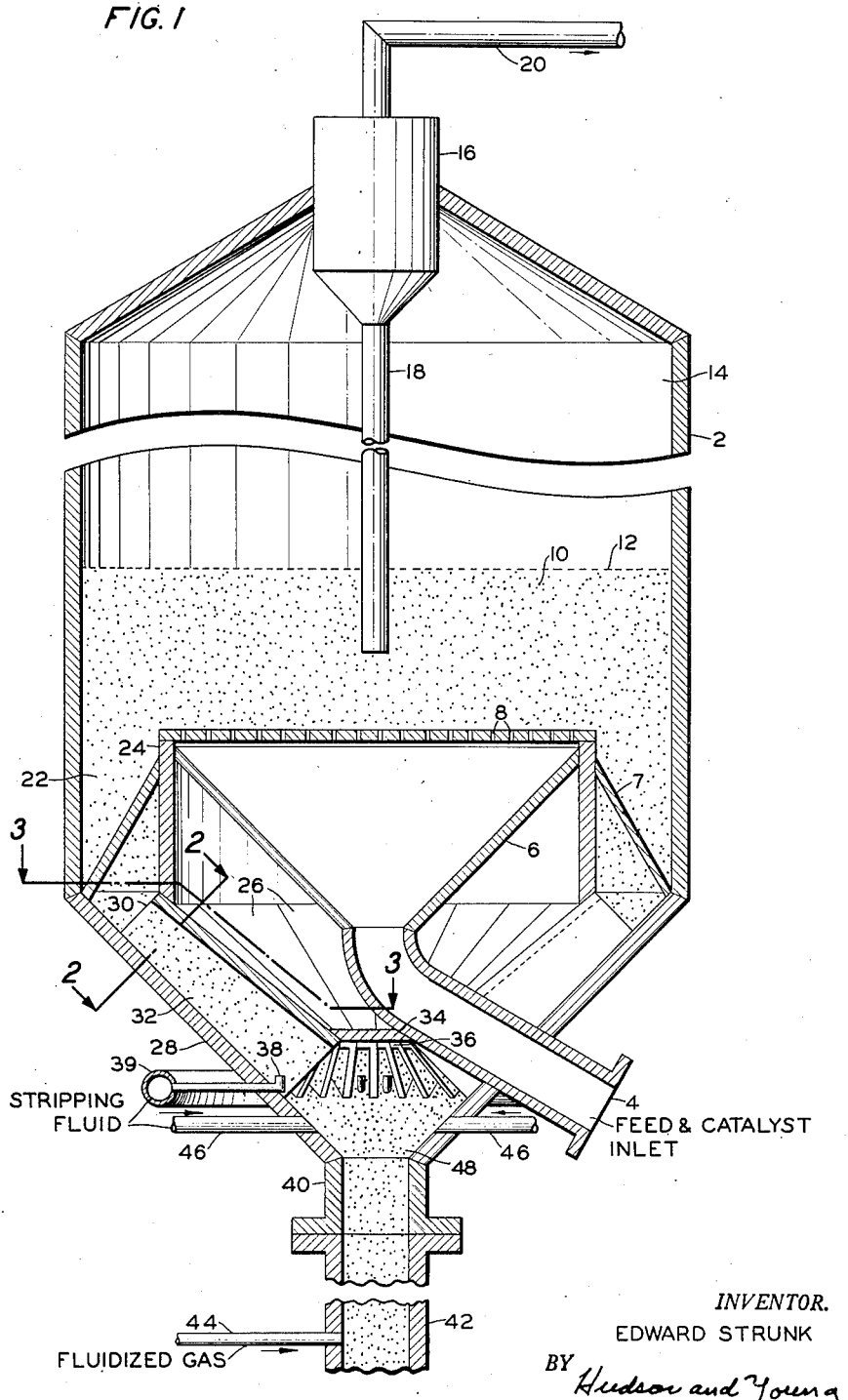
Figure 1 represents a vertical longitudinal cross-section of one form of apparatus adapted to be used in carrying out this invention.

Referring now to Figure 1 of the drawing, the reference character 2 designates a reactor having an inlet 4 through which a mixture of solid catalyst or contact particles and reactants is passed. The oil, prior to being introduced into reactor 2, is vaporized, either prior to mixing the catalyst therewith or by adding sufficient hot regenerated catalyst to the oil to effect the vaporization. When employing a topped or reducing crude in the cracking process the amount of catalyst intermixed with the oil should be sufficient to completely absorb the unvaporized constituents of the crude and thereby form a relatively dry suspension of oil vapors and catalyst. The resulting mixture is passed through inlet 4, inverted conical member 6 and perforated distribution plate 8 to reactor 2.

The velocity of the oil vapors passing upwardly through reactor 2 is preferably controlled to cause the bulk of the catalyst to segregate into a relatively dense layer in the lower portion of the reactor, as shown at 10 with a level indicated at 12. When employing a catalyst having a particle size less than 200 mesh, this velocity may be of the order of from 0.5 to 5 feet per second and preferably between 1 and 3 feet per second.

The reactor 2 is preferably constructed of such height as to provide a substantially free space 14 above the layer of catalyst within the reactor in order to reduce the amount of entrained catalyst removed from the reactor with the gaseous reaction products. In general, free space 14 above level 12 should be of the order of from 5 to 15 feet or more above the desired catalyst level to be maintained within the reactor. Level 12 of the dense layer of catalyst material in reactor 2 may be regulated within limits by controlling the rate of withdrawal of the catalyst from the reactor. The depth of the layer is regulated to provide adequate contact time for obtaining the desired conversion. When starting up the process and employing fresh catalyst having a relatively high order of activity the level within the reactor will be controlled to give a relatively short contact time so as to avoid overcracking. However, as the activity of the catalyst depreciates, the level of the catalyst is increased, thereby increasing the contact time to compensate for the drop of the activity of the catalyst. The cracked products, after passing through reactor 2, are introduced into cyclone separator 16 for removal of catalyst entrained therein. As illustrated, this separator is shown mounted at the upper end of reactor 2. It will be understood, however, that the separator may be positioned outside the reactor. Other suitable separating devices, such as filters, precipitators, or the like, may be used in place of the cyclone separator.

The catalyst separated from the cracked products in the separator 16 is returned to the fluidized catalyst bed 10 in the lower portion of reactor 2 through vertical conduit 18. The cracked products, after passing through the cyclone separator 16, are withdrawn through line 20 and are passed into a fractionating system (not shown) for recovering desired products.

Reactor 2 may be maintained at a temperature in the range of 850 to 1100° F. but it is preferable to maintain this temperature in the order of 925 to 1025° F. The pressure on reactor 2 is usually low, preferably in the range of 1 to 15 p. s. i. g., but in some cases it may be higher, depending upon the particular circumstances.

The catalyst employed for the cracking operation may be an activated clay or a synthetic gel comprising silica and alumina or other types of adsorbent gels suitable for effective conversion. The catalyst may be fluidized or in bead form. It is preferred to employ catalysts in a finely divided form having a particle size finer than 200 mesh. The amount of hot regenerated catalyst introduced into the oil stream contained in inlet 4 may vary over a considerable range, depending upon the type of oil treated, the degree of conversion desired, type of products desired, the temperature of the cracking treatment, and other factors. In general, the amount of catalyst so introduced will be of the order of from 1 to 20 or more parts by weight of catalyst per part of oil, but the preferred amount is from 1 to 10 parts by weight of catalyst per part of oil.

During the catalytic cracking operation, coke or carbonaceous material is deposited on the catalyst particles and the particles become spent or deactivated. The spent catalyst particles are then withdrawn from reactor 2 and sent to a regeneration zone (not shown) where the coke or carbonaceous material is burned and the hot regenerated catalyst particles are returned to the reactor 2 through inlet 4. Before passing the spent or contaminated catalyst particles to the regeneration zone it is desirable to pass them through a stripping or purging zone to remove entrained vapors and gases and some of the adsorbed hydrocarbon vapors and gases by means of a stripping gaseous fluid.

Figure 2:
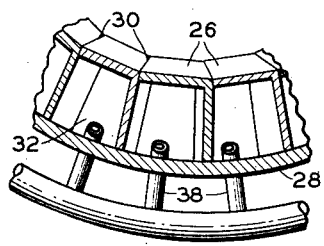
Figure 2 represents a horizontal cross-section of the stripping zone of Figure 1 taken on the line 2—2.
Figure 4:
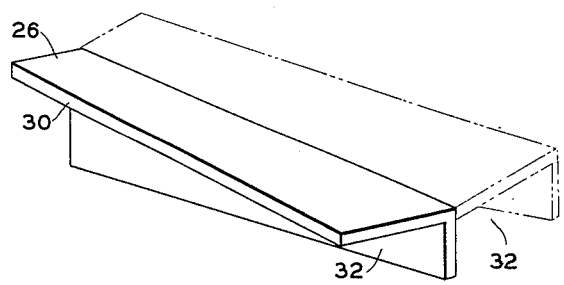
Figures 4 and 5 represent projected views of alternative embodiments of a stripper cell which may be used in practicing this invention.
Figure 3:
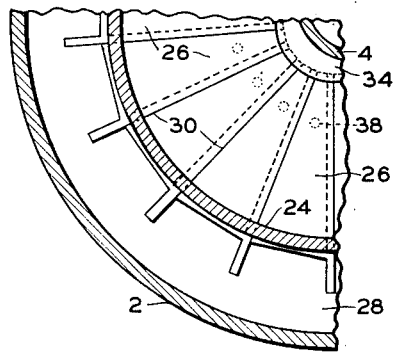
Figure 3 represents a cross-section of the stripping zone of Figure 1 taken on the line 3—3.
Figure 5:
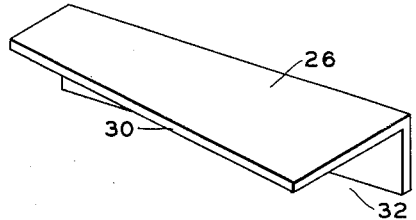

Located around the periphery of conical member 6 at the lower portion of reactor 2 is an annular space 22 which is formed between the inner wall of reactor 2 and a smaller-diameter, concentrically and vertically arranged skirt 24 which depends from the periphery of perforated distribution plate 8. Conical member 6 is supported by supporting members 7. Arranged below conical member 6 and spaced therefrom is a second inverted conical member 26 which has its upper end secured to the bottom end of skirt 24. Conical member 26 is spaced from conical bottom 28 of reactor 2. Partitions 30 are positioned radially between conical bottom 28 and conical member 26 forming a plurality of radially and downwardly extending cellular stripping sections 32, as shown in Figures 2 and 3. Conical member 26 may be formed of the upper sections of a series of radially extending inverted L-shaped partitions such as those shown in Figures 4 and 5. The width of each cellular stripping section 32 decreases toward the center of the reactor, as shown in Figure 4, and the height of each stripping section 32 increases toward the center to maintain the required flow area for proper flow rates of catalyst and stripping medium. If desired, however, radial partitions 30 may be designed so that the height of cellular stripping sections 32 does not increase but remains uniform as the width of the cellular sections 32 decreases, as shown in Figure 5. Plate 34 is positioned at the lower end of conical member 26 to close opening 36. In some cases it may not be desirable to close opening 36.

Catalyst containing strippable material is continuously withdrawn from the main fluidized bed of reactor 2 through the annular space 22 and discharged into cellular stripping sections 32 through which it flows. A gaseous stripping fluid is introduced through lines 38 extending from header 39 to each stripping cell and the stripping fluid flows countercurrent to the catalyst flowing downwardly through cellular stripping sections 32, thereby stripping volatile hydrocarbons from the catalyst particles. It is to be understood that some stripping will take place in annular space 22, however, the principal stripping zone is in the cellular sections 32.

Stripping or purging gas may be introduced by individual injection points into the bottom of each stripping section formed by the partitions. Alternatively, stripping gas may be introduced into the lower part of the bottom conical member of reactor 2 by lines 46 and distributed into the separate stripping sections by the dispersing action of the dense catalyst bed 48.

The catalyst is stripped in the dense phase while flowing downwardly and countercurrently to a stripping fluid, such as steam. The stripping fluid has a velocity within the range of between about 0.05 and 3.0 feet per second. The stripping section is characterized by radial partitions defining a plurality of elongated stripping cells each having a cross-sectional area within the range of about 1 to 5 or more square feet and having a ratio of length to diameter in the range of about 4 to 12.

The stripped catalyst particles, still in dense fluidized condition, are passed to the lower part of the conical bottom 28 of reactor 2 wherein they are maintained in a fluidized condition, as shown at 48, by the introduction of fluidized gas through lines 44. The stripped fluidizing catalyst particles are then passed through reduced outlet 40 to standpipe 42 in which they are maintained in a liquid-like condition to produce a hydrostatic condition at the base of the standpipe which is of sufficient magnitude to move the catalyst particles to a regeneration zone, not shown.

While a certain number of partitions have been shown in the drawing, it is to be understood that these are by way of illustration only and the number of such partitions may be changed while still obtaining the benefits of this invention. By subdividing the stripping zone into a plurality of smaller sections a zone of low ratio of length to effective diameter is changed to a plurality of sections, each with a high ratio of length to effective diameter.

It is to be understood that this invention should not be unnecessarily limited by the above discussion and disclosure and that modificationss and variations may be made without departing from the invention or from the scope of the claims.

I claim:

1. A reaction vessel for effecting contact between fluidized solid contact particles and a reactant gas and then stripping said particles of said gas by contact with a stripping gas, which comprises in combination an enclosed upright cylindrical vessel having a gas outlet in the upper end thereof and a conical bottom extending downwardly therefrom at an angle in the range of 15 to 75° to a solids outlet at its apex; a series of radially disposed upright inverted L-shaped members fixed on and extending along an intermediate section of the inside surface of said conical bottom so as to form a series of radial stripping channels higher and narrower at their lower than at their upper ends thereby providing more uniform cross sectional area than would be provided with ends of similar cross-section, the upper sections of said L-shaped members adjoining the next member on either side so as to form a generally conical continuous roof over said channels; an annular member extending upwardly from the outer periphery of said conical roof so as to form an annular space between said annular member and the inner wall of said vessel, said space communicating with said channels and with the interior of said vessel; a perforate plate covering said annular member; a funnel-shaped member within said annular member contiguous to the latter at the lip of the funnel and having an inlet conduit at its small end extending through the outer wall of said vessel for distributing a fluidized mixture of feed gas and solid contact particles to said vessel; and conduit means communicating with the space at the lower ends of said channels for introducing stripping gas thereto.

2. The apparatus of claim 1 in which the bottom of said vessel is inclined at an angle in the range of 25 to 50° with the vertical.

3. A reaction vessel for effecting contact between fluidized solid contact particles and a reactant gas and then stripping said particles of said gas by contact with a stripping gas, which comprises in combination an enclosed upright cylindrical vessel having a gas outlet in the upper end thereof and a conical bottom extending downwardly therefrom at an angle in the range of 15 to 75° to a solids outlet at its apex; a series of radially disposed upright inverted L-shaped members fixed on and extending along an intermediate section of the inside surface of said conical bottom so as to form a series of radial stripping channels higher and narrower at their lower than at their upper ends thereby providing more uniform cross sectional area than would be provided with ends of similar cross-section, the upper sections of said L-shaped members adjoining the next member on either side so as to form a generally conical continuous roof over said channels; an annular member extending upwardly from the outer periphery of said conical roof so as to form an annular space between said annular member and the inner wall of said vessel, said space communicating with said channels and with the interior of said vessel; a perforate plate covering said annular member; means comprising a conduit communicating with the space directly below said perforate plate for distributing a fluidized mixture of feed gas and solid contact particles through said plate to said vessel; and conduit means communicating with the space at the lower ends of said channels for introducing stripping gas thereto.

4. A reaction vessel for effecting contact between fluidized solid contact particles and a reactant gas and then stripping said particles of said gas by contact with a stripping gas, which comprises in combination an enclosed upright cylindrical vessel having a gas outlet in the upper end thereof and a conical bottom extending downwardly therefrom at an angle in the range of 15 to 75° to a solids outlet at its apex; a series of radially disposed upright partitions extending along an intermediate section of the inside surface of said conical bottom having a generally conical roof thereon so as to form a series of sloping radial stripping channels along said bottom; an annular member extending upwardly from the outer periphery of said conical roof so as to form an annular space between said annular member and the inner wall of said vessel, said space communicating with said channels and with the interior of said vessel; a perforate plate covering said annular member; a funnel-shaped member within said annular member contiguous to the latter at the lip of the funnel and having an inlet conduit at its small end extending through the outer wall of said vessel for distributing a fluidized mixture of feed gas and solid contact particles to said vessel; and conduit means communicating with the space at the lower ends of said channels for introducing stripping gas thereto.

5. A reaction vessel for effecting contact between fluidized solid contact particles and a reactant gas and then stripping said particles of said gas by contact with a stripping gas, which comprises in combination an enclosed upright cylindrical vessel having a gas outlet in the upper end thereof and a conical bottom extending downwardly therefrom at an angle in the range of 15 to 75° to a solids outlet at its apex; a series of radially disposed upright partitions extending along an intermediate section of the inside surface of said conical bottom having a generally conical roof thereon so as to form a series of sloping radial stripping channels along said bottom; an annular member extending upwardly from the outer periphery of said conical roof so as to form an annular space between said annular member and the inner wall of said vessel, said space communicating with said channels and with the interior of said vessel; a perforate plate covering said annular member; a funnel-shaped member within said annular member below said perforate plate, said funnel-shaped member having an inlet conduit at its small end extending through the outer wall of said vessel for distributing a fluidizing mixture of feed gas and solid contact particles to said vessel; and conduit means communicating with the space at the lower ends of said channels for introducing stripping gas thereto.

EDWARD STRUNK.

References Cited in the file of this patent

UNITED STATES PATENTS

| Number | Name | Date |
|---|---|---|
| 2,415,755 | Ogorzaly et al. | Feb. 11, 1947 |
| 2,443,190 | Krebs | June 15, 1948 |